July 3, 1923.
H. NEWMAN
LOADING MEANS FOR FILM MAGAZINES FOR CAMERAS
Filed Aug. 9, 1922
1,460,435
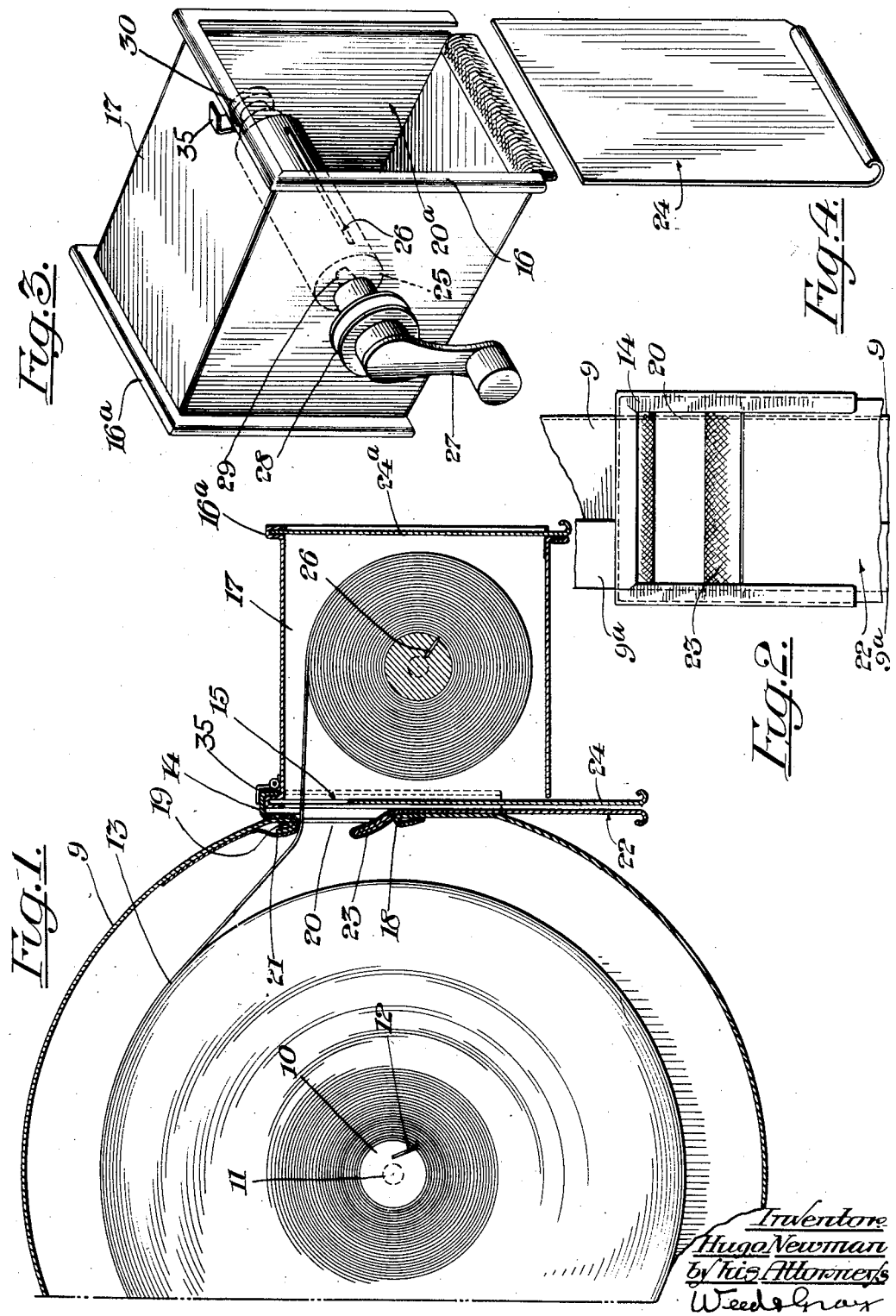

Patented July 3, 1923.

1,460,435

UNITED STATES PATENT OFFICE.

HUGO NEWMAN, OF NEW YORK, N. Y.

LOADING MEANS FOR FILM MAGAZINES FOR CAMERAS.

Application filed August 9, 1922. Serial No. 580,617.

*To all whom it may concern:*

Be it known that I, HUGO NEWMAN, a citizen of the United States, residing at New York, in the county of New York and State of New York, have invented certain new and useful Improvements in Loading Means for Film Magazines for Cameras, of which the following is a specification.

This invention relates to means or apparatus for loading film magazines or boxes for cameras, and more particularly for loading magazines or film boxes adapted to be detachably connected to the outside of the camera casing, an object of this invention being to provide a relatively inexpensive, efficient and facile means for transferring or reeling wound or reeled film from a storage container into the film magazine, and at the same time without permitting the entrance of any light into the mechanism.

A further object of this invention is to provide a storage container for reeled films and a film box or magazine adapted to be detachably connected thereto, the container and magazine when connected having a light-tight passage from one to the other, and the magazine having means for reeling the film.

A further object of this invention is to provide a storage container for storing reeled film so constructed as to permit the same to be readily attached to a film magazine for cameras, and also to permit the film to be unreeled therefrom and transferred into the magazine without exposing the film to light.

Other objects of this invention will appear in the following description thereof, reference being had to the accompanying drawings forming a part of this specification, wherein like reference characters indicate corresponding parts in the several views and wherein Fig. 1 is a central, longitudinal sectional view illustrating the storage container and the film magazine in operative position; Fig. 2 is a fragmentary end view of the storage container illustrating the film passage and other parts; Fig. 3 is a perspective view of the film box or magazine; and Fig. 4 is a perspective view of a slide in position to be connected to the magazine of Fig. 3.

The present invention, of which a preferred embodiment is herein illustrated by way of example, comprises in general a storage container or transfer box for storing a relatively large amount of film and having means for detachably connecting the same to a film box or magazine which is preferably constructed for connection to the casing of a camera. The storage container and magazine are provided with openings which, when the container and magazine are joined together and juxtaposed, form a light-tight passage permitting the transfer of the film from the container to the magazine, suitable mechanism being provided for unreeling the film from the storage container and reeling it within the magazine. It will of course be understood that the storage container may be of any shape or size and that the film magazine may also be of any shape or size without in any way departing from the spirit of this invention. In my copending application for attachments for cameras, filed Aug. 1, 1922, Serial No. 578,863 I have illustrated a form of hand camera with a film box or magazine adapted to be detachably connected to the casing of the camera. Since the present apparatus is particularly adapted for use with magazine attachments as shown in my aforesaid copending application, I have by way of example illustrated herein a magazine or film box such as shown and described in the said application.

In carrying out my invention a storage container 9 is provided which may comprise as illustrated a round box or housing having a detachable cover $9^a$ adapted to permit the loading of the container with large reels of film. The film is reeled on a suitable spool or spindle 10 rotatably journalled or pivoted at 11 to opposite sides of the container. The spool 10 is preferably formed of wood and is provided with the usual angular slit 12 for receiving the end of the film strip 13 which is reeled or wound thereabout. The storage container 9 is provided with an opening 20 preferably at a suitable point in its peripheral face for the unreeling of the film therefrom. As illustrated particularly in Fig. 2 the opening 20 is bounded by a guide frame 14, the latter constructed to form a channel or guideway 15 so as to permit the guide frame to be slid or slipped over a guide frame 16 carried by a film box or magazine 17. It will be noted that the opening 20 may be of less size than the opening $20^a$ at the end of the magazine 17, and the edges 18 and 19 at the opening are bent or partially coiled inwardly to form protecting edges, the upper of which may, as indicated at 21, be covered with plush or other suitable material so as to prevent the film from becoming scratched or damaged while being fed through the opening 20 into the film box 17.

This opening 20 in the storage container 9 is preferably provided with a closure, which may be in the form of a slide member 22. In the present instance the upper edge of the slide member 22 is bent inwardly at 23, such bent portion having a protecting cover of plush or other suitable material and overlapping the curled edge 19 and cooperating therewith when the slide is closed thereby to form a light-tight joint. The guide frame 16 of the film box or magazine also forms a guide space for the insertion of a slide 24, which when closed also forms a light-tight joint. If desired the magazine 17 at the opposite end may be provided with a corresponding guide frame 16$^a$ adapted to receive a closure slide 24$^a$, the purpose thereof being to permit the quick discharge or unloading of the film box when used as a take-up magazine as described in my aforesaid copending application, and also to permit the film magazine to be reversible.

The magazine 17 is provided with suitable mechanism for reeling the film and in the present instance the construction of this mechanism may be substantially the same as shown in my above-mentioned copending application. Thus the film may be reeled upon a suitable spindle or spool 25 provided with the usual slit 26 for attaching the end of the film thereto. This spool is rotatably carried between a pair of pivots at opposite sides of the film box, the pivots being spring controlled and adapted upon being slightly withdrawn from engagement with the spool 25 to permit the release of the spool and hence the discharge of the film. It will be understood that the handle 27 is threaded for disengagement therefrom to a pulley wheel 28, which has a squared shank 29 releasably extending into a hole in the spool 25 for driving the same. The pivot at the opposite side of the magazine comprises a plunger 30, and both the pulley 28 and plunger 30 are constructed for withdrawal against the action of springs (not shown). This construction is fully described in my aforesaid copending application, and a further detailed description thereof is not deemed necessary herein.

In operation it will be understood that the slide 22 is preferably closed until the container 9 is attached in position to the magazine 17 as shown in Fig. 1, the end of the film strip having previously been secured in the slit 26 of the spool 25, and the latter placed in position within the film box for reeling. Thereupon the closure 22 may be opened as well as the closure 24 of the magazine and after connecting the handle 27 in position, the film may be readily wound upon the spool 25. and fed from the storage container 9 through the passage 20. After a sufficient amount of film has been transferred to the film box, the slides 22 and 24 may be closed, the container 9 slipped off the guide frame 16 and the film strip cut. It will be obvious that the end of the film projecting from the magazine 17 may be readily fed into the camera and the film box or magazine 17 quickly secured in position to the casing of the camera as shown in my copending application. It will be understood also that the magazine 17 may be loaded without first detaching it from the camera casing since the guide frames at opposite ends of the film box are so constructed as to render the same reversible, and hence either end thereof may be attached to the camera casing. In order to prevent the transfer container and magazine 17 from becoming accidentally disengaged during the operation of the device, a hinged latch or hook 35 may be connected to the top of the magazine and adapted to hook over the top of frame 14.

It will be understood that by describing in detail herein any particular form, construction or arrangement, it is not intended to limit the invention beyond the terms of the several claims or the requirements of the prior art.

I claim as my invention:

1. The combination of a film storage container and a film box adapted to be connected thereto to form a light-tight passage from one to the other, and mechanism carried by said film box for transferring the film thereto from the container.

2. The combination of a film storage container and a film box adapted to be connected thereto to form a light-tight passage from one to the other, and detachable reel mechanism carried by said film box for transferring the film thereto from the container.

3. The combination of a storage film container and a film box adapted to be connected thereto to form a light-tight passage from one to the other, and detachable reel mechanism carried by said film box for transferring the film thereto from the container, said mechanism comprising a spool releasably mounted within the film box, and a handle detachably connected thereto.

4. Loading means for film magazines comprising a storage container for reeled films, a film magazine, means for connecting said container and magazine together, and means for transferring the film from the container to the magazine.

5. Loading means for film magazines comprising a storage container for reeled films, a film magazine having means for detachable connection to the outside of a camera casing, means for connecting said container and magazine together, and means for transferring the film from the container to the magazine.

6. Loading means for film magazines comprising a storage container for reeled films, a film magazine, means for connecting said container and magazine together, said container and magazine when connected having a light-tight passage therethrough, and means for transferring the film from the container to the magazine.

7. The combination of a film transfer container and a film magazine, one thereof having means shiftable within a part of the other, to form an interlocking connection, and means for feeding film from one to the other.

8. Loading means for film magazines comprising a storage container for reeled films, a film magazine, means for detachably connecting said container and magazine together, said container and magazine when connected together having a light-tight pasage from one to the other.

9. The combination of a storage container for reeled films having an opening thereinto and means for closing the same, a film magazine having an opening thereinto and means for closing the same, guide means for detachably connecting the container and magazine whereby said openings may be juxtaposed to form a passage, and means for winding the film from the container into the magazine.

10. The combination of a film transfer container and a film magazine, one thereof having means shiftable within a part of the other to form an interlocking connection, a pair of means shiftable to form a passage from one into the other, and means for feeding film therethrough.

11. The combination of a storage container for reeled film having an opening thereinto and means for closing said opening, a film box adapted to be connected in position over said opening and having an opening forming therewith a passage, means for closing said opening, and means for reeling film from said container into the film box.

12. The combination of a film transfer box and a film magazine, one thereof having means for shiftably receiving a part of the other and constructed to form a light-tight joint, and one thereof having means shiftable to form a film passage into the other.

13. The combination of a film transfer box and a film magazine, one or both thereof having means for shiftably receiving a part of the other and constructed to form a light-tight joint, and one thereof having means shiftable to form a film passage from one into the other, and means for transferring film from the transfer box into the magazine.

14. A film transfer container comprising a box-like housing adapted to support for rotation therein a reel of film and having an opening for the passage of the film therefrom, guide means adjacent to said opening, and a slide shiftable therein for closing the opening.

Signed at New York, N. Y., this 3rd day of August, 1922.

HUGO NEWMAN.